March 10, 1959 T. F. SUGGS 2,877,082
MEASURING AND RECORDING MECHANISM
Filed April 21, 1955 7 Sheets—Sheet 1
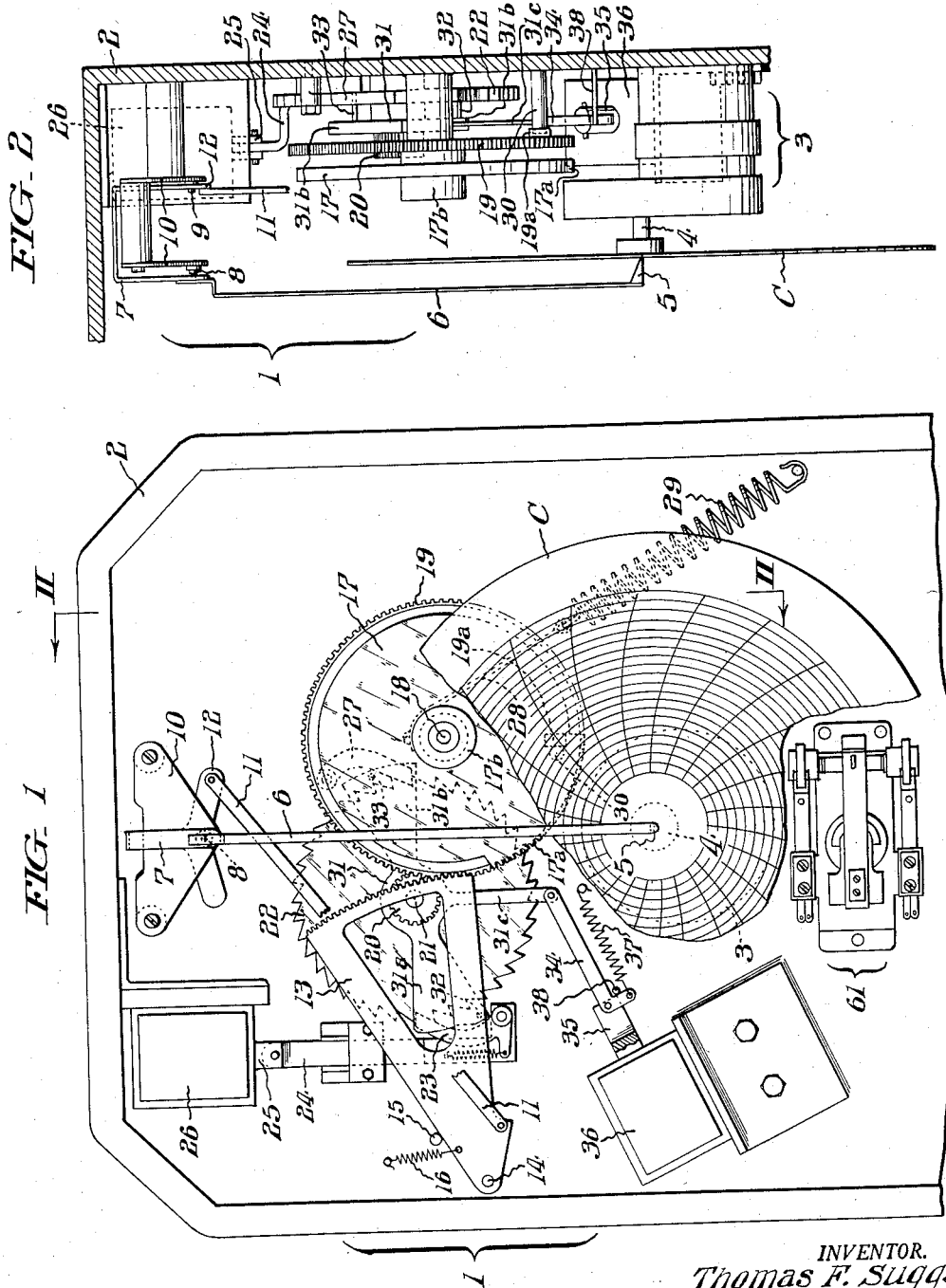
INVENTOR.
Thomas F. Suggs,
BY Paul & Paul
ATTORNEYS.

March 10, 1959 T. F. SUGGS 2,877,082
MEASURING AND RECORDING MECHANISM
Filed April 21, 1955 7 Sheets-Sheet 2
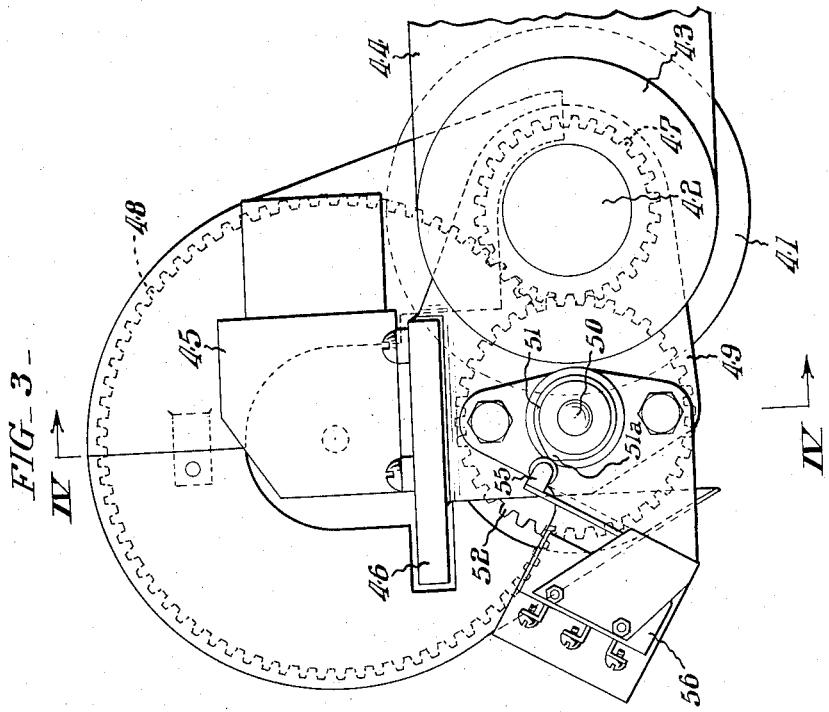
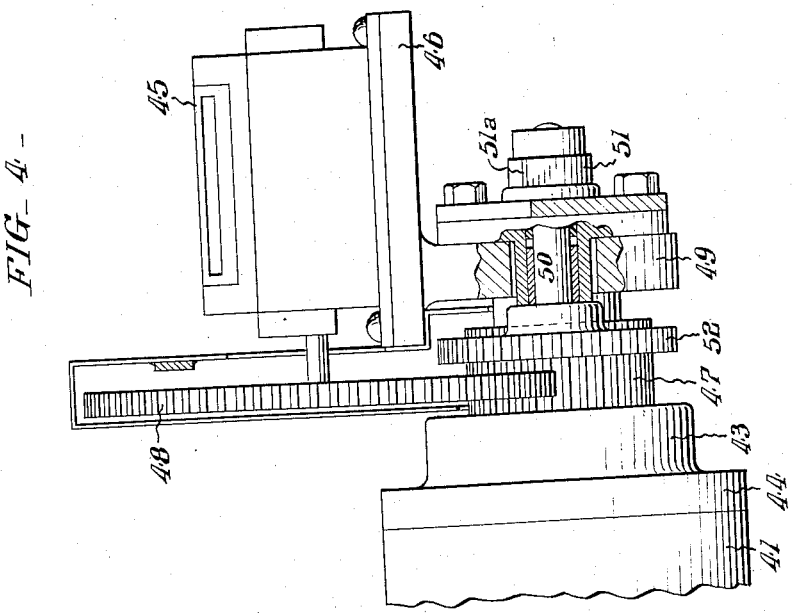
INVENTOR.
Thomas F. Suggs,
BY Paul & Paul
ATTORNEYS.

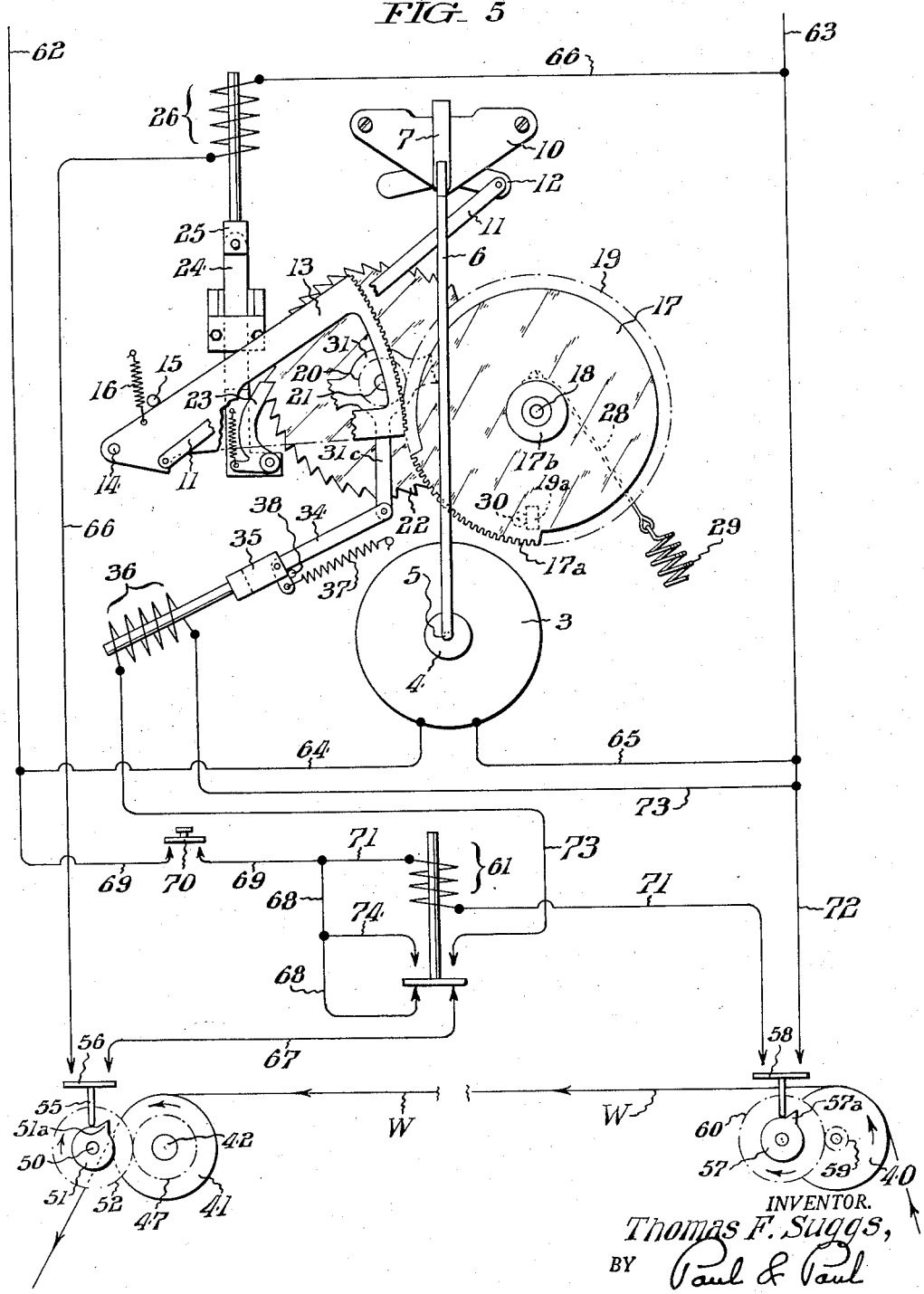

March 10, 1959  T. F. SUGGS  2,877,082
MEASURING AND RECORDING MECHANISM
Filed April 21, 1955  7 Sheets-Sheet 4

INVENTOR.
Thomas F. Suggs,
BY Paul & Paul
ATTORNEYS.

March 10, 1959

T. F. SUGGS 2,877,082

MEASURING AND RECORDING MECHANISM

Filed April 21, 1955

INVENTOR.
Thomas F. Suggs,
BY Paul & Paul
ATTORNEYS.

March 10, 1959 T. F. SUGGS 2,877,082
MEASURING AND RECORDING MECHANISM
Filed April 21, 1955 7 Sheets-Sheet 6

INVENTOR.
Thomas F. Suggs,
BY Paul & Paul
ATTORNEYS.

March 10, 1959 T. F. SUGGS 2,877,082
MEASURING AND RECORDING MECHANISM
Filed April 21, 1955 7 Sheets-Sheet 7

INVENTOR.
Thomas F. Suggs,
BY Paul & Paul
ATTORNEYS.

2,877,082

MEASURING AND RECORDING MECHANISM

Thomas F. Suggs, Gastonia, N. C., assignor to Cocker Machine & Foundry Company, Gastonia, N. C., a corporation of North Carolina Application April 21, 1955, Serial No. 502,865

4 Claims. (Cl. 346—123)

This invention relates to measuring and recording mechanism. More particularly, it is concerned with mechanism useful in measuring and recording shrinkage or contraction of strand or sheet material incident to passage about a pair of rolls supported for free rotation in spaced relation, as for example, the entering and delivery rolls of a slasher such as employed in the textile industry to size and beam warp yarns in preparation for weaving.

The chief aim of my invention is to provide a simple and reliable mechanism which is entirely automatic in its operation and capable of accurately measuring and recording the percentage of stretch or contraction in prescribed unit lengths of the strand or sheet material as it passes about the spaced rolls of the slasher.

Other objects and attendant advantages will appear from the following detailed description of the attached drawings, wherein:

Fig. 1 is a fragmentary view, in front elevation, of a specially constructed recorder which constitutes one of the component elements of my improved measuring and recording mechanism, and of which the cover for its casing has been removed to expose various of the parts which otherwise would be hidden.

Fig. 2 is a vertical sectional view of the recorder taken as indicated by the angled arrows II—II in Fig. 1.

Fig. 3 is a fragmentary view in side elevation of a portion of a slasher or the like showing the entering roll thereof and the parts directly associated with it.

Fig. 4 is a fragmentary view partly in front elevation and partly in vertical section taken as indicated by the angled arrows IV—IV in Fig. 3.

Fig. 5 is a diagrammatic view showing the complete mechanism with the recorder set for the initiation of a measuring and recording cycle.

Figure 6:
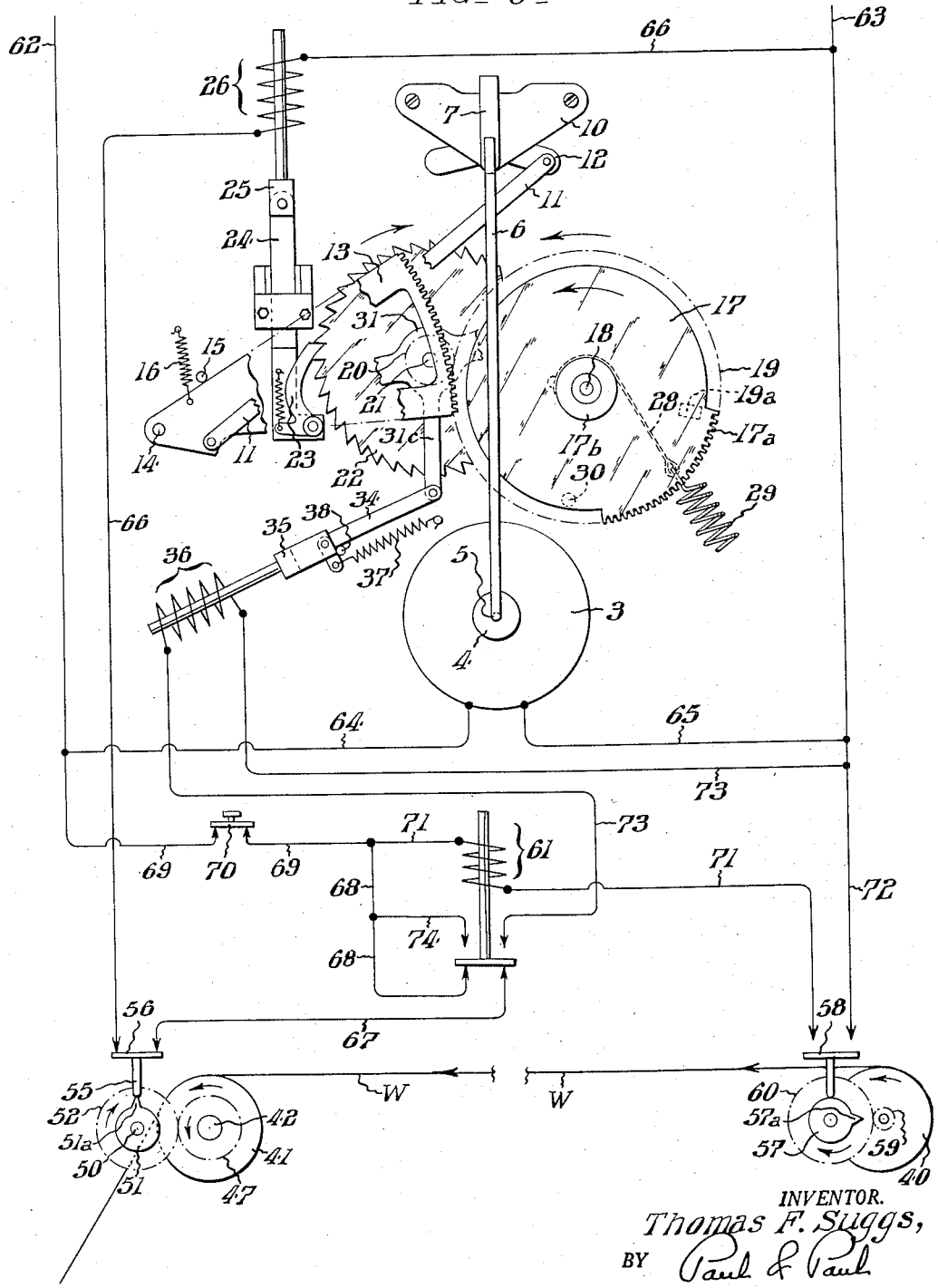
Figs. 6 and 7 are views similar to Fig. 5 showing the relative positions assumed by the parts in different phases of a measuring and recording cycle.

With more detailed reference first more especially to Figs. 1 to 2 of these illustrations, the numeral 1 comprehensively designates a recorder having a casing 2 containing an electrically driven clock motor 3. Secured upon the arbor 4 of the clock motor 3 is a chart disc C arranged to be marked by a stylus or pen 5 at the distal end of a suspension arm 6 which is affixed to a yoke 7 whereof the extremities are pivoted at 8 and 9 to a bracket 10 within the casing 2 near the top of the latter. By means of a link 11, an arm projection 12 on one of the extremities of the yoke 7 is connected to a sector gear 13 which is fulcrumed for movement about a fixed stud 14 within the casing 2, and which is normally held raised in engagement with a stop 15 by the yielding pull of a tension spring 16. The sector gear 13 is arranged to be actuated by the toothed portion 17a of a segmental gear 17 freely rotative about another stud 18 within the casing 2. Secured to the hub 17b of the segmental gear 17 is a full toothed gear wheel 19 which meshes with a spur pinion 20 fast upon a shaft 21 rotatively borne within the casing 2. Also fast upon the shaft 21 is a ratchet wheel 22 arranged to be intermittently picked by a spring-biased pawl 23 which is pivoted to a slide 24 connected to the armature 25 of an actuating solenoid 26. The ratchet wheel 22 is held against retrogression by the detent pawl indicated at 27. Affixed at one end to the hub 17b of the sector gear 17 is a band or cable 28, said band being connected at its other end to a pull spring 29. Normally, the sector gear 17 is maintained against the pull of the spring through engagement of a lug 19a at the back of the gear wheel 19 with a stop stud 30 on the casing 2. Free on the shaft 21 is an element 31 having pin projections 32 and 33 on its oppositely extending arms 31a, 31b for dislodging the pawls 23 and 27 from the ratchet wheel 22 at the terminataion of each measuring and recording cycle as later on explained, the third arm 31c of said element being connected by a link 34 to the armature 35 of another actuating solenoid 36 within the casing 2. A draw spring 37, connected to the link 34, serves to maintain the armature 35 of the solenoid 36 normally retracted against a stop 38 with the pins 32 and 33 of the element 31 normally out of engagement with the pawls 23 and 27 as shown in Fig. 1.

In the diagrammatic drawings of Figs. 5–8, the entering and delivery rolls for example of a slasher are designated 40 and 41 respectively, and the warp yarns at W. As shown in detail in Figs. 3 and 4, the shaft 42 of the delivery roll 41 is journaled at each end in a bearing 43 provided on the frame 44 of the slasher. Associated with the delivery roll 41 is a counter 45 which is supported by a bracket 46, and which, through a pair of spur gears 47 and 48, is driven from the shaft 42 of said roll. Rotative in the supplemental bracket 49 is a short shaft 50 which carries a rotary cam 51 with a single high point 51a, and which is driven, through a spur gear 52, from the spur gear 47 on the shaft 42 of the delivery roll 41. In practice, the cam shaft 50 is so geared as to turn through one revolution for a definite length of the warp input, for example one yard. As further shown, the rotary cam 51 is arranged to actuate the roller arm 55 of a limit switch 56 to close the latter at the completion of each rotation of said cam. It is to be understood that a corresponding arrangement is provided for the cam 57 associated with the entering roll 40 (Fig. 5) for actuating a limit switch 58 similar to the limit switch 56 except in that the ratio of the gears 59, 60 is such that said cam is rotated once for each input of one hundred yards of the warps W.

Further embodied in the mechanism is a relay which is conventionally represented at 61 in Figs. 5–8 and which may be located within the housing 2 of the recorder 1 as shown in Fig. 1. The electric current used in the operation and control of the mechanism is supplied from a pair of power mains 62, 63 across which the clock motor 3 is directly connected by conductors 64 and 65. The coil of the solenoid 26 is interposed in a conductor 66 which extends to one contact of the limit switch 56, the other contact of said switch being connected, by a conductor 67, to one contact of the relay 61. The corresponding other contact of the relay 61 is connected by a lead 68 to a conductor 69 which latter is connected, in turn, to the main 62 and in which is interposed a manually-operable starting switch 70. The coil of the relay 61 is interposed in a conductor 71 which extends to one contact of the limit switch 58, the other contact of the latter being connected, through a conductor 72 to the main 63. The coil of the solenoid 36 is interposed in a conductor 73 which extends from the main 63 to the third terminal of the relay 61, the fourth and corresponding terminal of the said relay being connected, through a lead 74, to the conductor 68.

Figure 9:
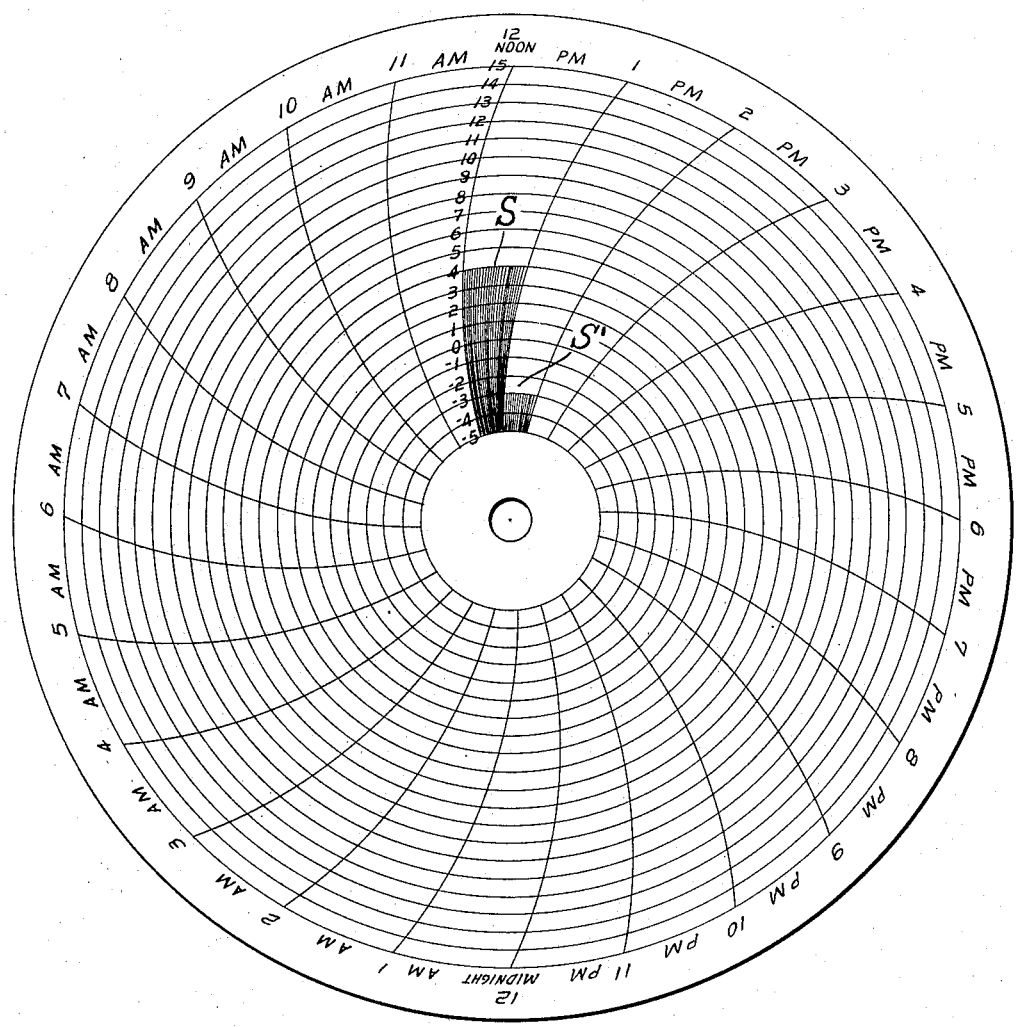
Fig. 9 shows a chart disc such as I use in the recorder.

Referring to Fig. 9, it will be noted that the chart C is graduated from 0 to 5 toward the center, and from 0 to 15 toward the perimeter, and it is to be understood that the graduations inward of the zero circle represent yarn shrinkage and those outward of the zero circle represent yarn stretch.

*Operation*

Figure 7:
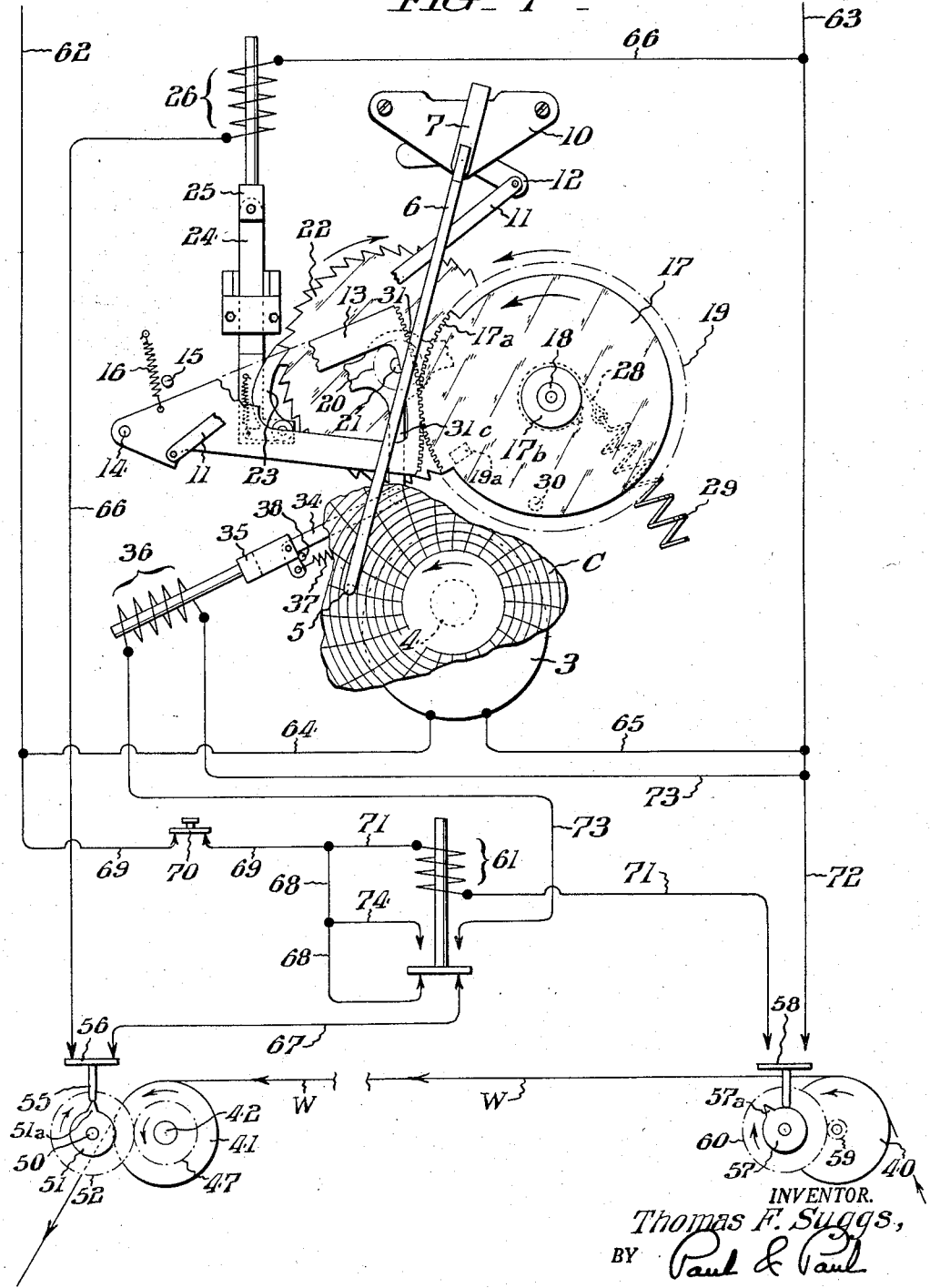
Figure 8:
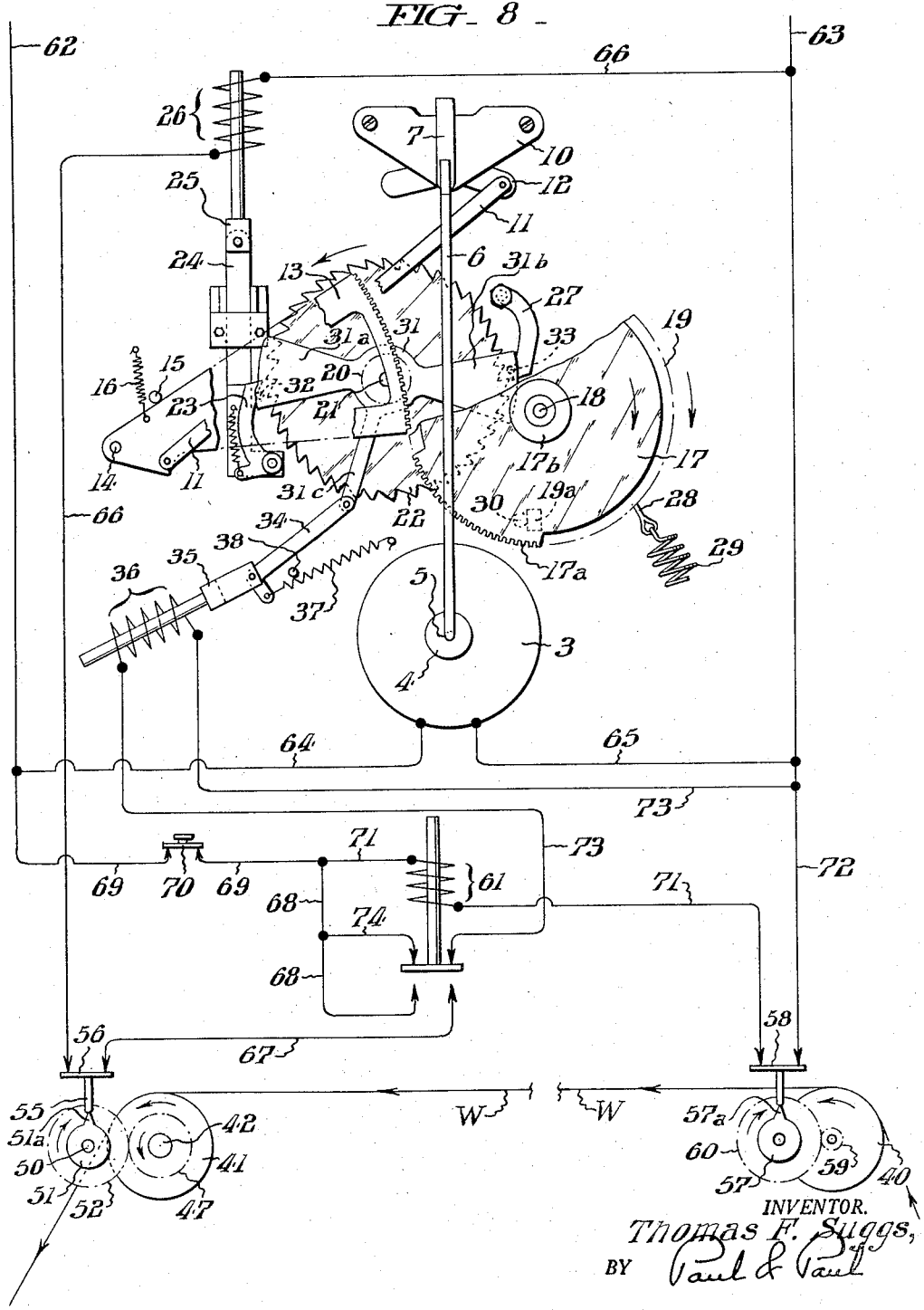
Fig. 8 is a view similar, in turn, to Fig. 5 showing how the recorder is re-set at the completion of a measuring and recording cycle.

The spaced entering and delivery rolls 40 and 41 are rotated in the direction indicated by the arrows thereon in Figs. 6–8 by virtue of being in peripheral running contact with the warps W. In Figs. 1 and 5, the parts of the recorder 1 are shown in the dormant positions which they normally occupy at the initiation of a recording cycle. To start a cycle, the manual switch 70 is closed as in Fig. 6 and, as a definite length of the warps W (in the exemplified instance one yard) passes about the delivery roll 41, the cam 51 is turned by the gears 47, 52 through a complete revolution at the end of which the limit switch 56 is closed by the high spot 51a of said cam. As a result, the circuit 62, 69, 70, 68, 67, 56, 66, 63 is established through the coil of the solenoid 26 which, in being energized, causes a tooth of the ratchet wheel 22 to be picked and said wheel to be stepped in the direction of the arrow thereon. This incremental movement is communicated, through the gears 20 and 19 to the shaft 18 and, in turn, to the segmental gear 17. This action takes place repeatedly until the first tooth of the segmental gear 17, in the direction of rotation of the latter, comes into mesh with the gear sector 13 which thereafter is intermittently moved clockwise in Fig. 7 for a time until the cam 57 has turned through a complete rotation after passage, in the exemplified instance, of 100 yards of the warps W over the entering roll 40, with incidental recording of the action upon the slowly rotating disc chart C, by the stylus 5 whereof the arm 6 has been moved in the meantime through its link connection 11 with said sector. It is to be understood that, with the segmental gear 17 set relative to the gear sector 13 as in Figs. 1 and 5, the recording action will begin after about 95% (95 yds.) of the warp length selected for measurement has passed about the entering roll 40. Finally, after 100 yards of the warps have overpassed the entering roll 40 and the cam 57 has turned through a complete revolution, the limit switch 58 is closed as in Fig. 8 by the high point 57a of said cam. The circuit 62, 69, 70, 71 and 72, 63 through the coil of the relay 61 is thereby closed, with incidental establishment, at the same time, of the circuit 62, 68, 74, 73, 63 through the coil of the solenoid 36. By energization of the solenoid 36, the element 31 is actuated, through the link 34, to dislodge the pawls 23 and 27 simultaneously from the teeth of the ratchet wheel 22 which, and the segmental gear 17 and the sector gear 13 are immediately reversely rotated thereupon to the original positions of Fig. 5 by the pull of the spring 29 upon the band 28 with said sector gear stopped against the stud 15 and the stylus arm 6 returned to starting position in readiness for the initiation of another recording cycle after the high point of the cam 57 has passed from beneath the actuating arm of the switch 58. If, for example, the cam 51 associated with the delivery roll 41 has turned, say through 104 revolutions during the cycle while 100 yards of warps have entered over the roll 40, the reading marked on the disc chart C by the stylus 5 will indicate a 4% stretch as indicated at S in Fig. 9. On the other hand, if the cam 51 had turned, say through 97 revolutions during the cycle with entry of 100 yards of warp over the roll 40, then the reading marked on the chart C by the stylus 5 would indicate a shrinkage of 3% as at S' in Fig. 9. The recording is thus dependent upon variations in the speed ratio as between the entering and delivery rolls 40 and 41.

While the preferred embodiment of this invention has been described in some detail, it will be obvious to one skilled in the art that various modifications may be made without departing from the invention as hereinafter claimed.

Having thus described my invention, I claim:

1. In a recorder, a clock motor for moving a recording chart; a stylus for marking the chart; a segmental gear rotatable about a fixed center; a delay action gear sector pivoted on another fixed center and adapted to cooperate with the segmental gear during the latter portion only of each operative cycle of the recorder; operative connections between the gear sector and the stylus; spring means for normally holding the gear sector retracted out of mesh with the segmental gear; a ratchet wheel with a spur pinion affixed thereto; a full-toothed gear secured to the segmental gear and meshing with the spur pinion; a pawl for picking the ratchet wheel, a detent for holding the ratchet wheel in shifted positions; an element operable to dislodge the pawl and the detent from the teeth of the ratchet wheel at the completion of an operative cycle of the recorder; and spring means for torsionally acting upon the segmental and fulltoothed gears for restoring the parts to their original positions at the end of each cycle of the recorder.

2. A recorder, according to claim 1, further including an electro-magnet for actuating the ratchet picking pawl; and a separate electro-magnet for actuating the pawl and detent retracting element.

3. A recorder, according to claim 1, further including an electro-magnet for actuating the ratchet picking pawl; a separate electro-magnet for actuating the pawl and detent retracting element; an intermittently operated switch for controlling current flow in a circuit containing the first mentioned magnet; and a normally open switch in a separate circuit containing the second mentioned magnet arranged to be closed after repeated picking of the ratchet wheel for re-cycling the recorder.

4. A recorder according to claim 1 useful, for example, in connection with a textile slasher or the like to record the stretch or the shrinkage of continuous material in strand or sheet form incident to travel of the material between spaced entering and delivery rolls, in which recorder the pawl is arranged to be actuated by an electro-magnet; in which the pawl and detent dislodging element is arranged to be actuated by a separate electro-magnet; in which the first mentioned electro-magnet is interposed in a circuit with a switch adapted to be closed once for each rotation of the delivery roll of the slasher; and in which the second mentioned electro-magnet is interposed in a separate circuit with a switch adapted to be closed after the entering roll of the slasher has turned through a predetermined number of multiple revolutions for re-cycling the recorder.

References Cited in the file of this patent

UNITED STATES PATENTS

| | | |
|---|---|---|
| 1,269,525 | Craighead | June 11, 1918 |
| 1,696,600 | Hall | Dec. 25, 1928 |
| 2,050,976 | Simon | Aug. 11, 1936 |
| 2,540,038 | Watson et al. | Jan. 30, 1951 |
| 2,720,361 | Halley | Oct. 11, 1955 |
| 2,730,898 | Fry | Jan. 17, 1956 |